(12) United States Patent
Bolon et al.

(10) Patent No.: US 8,224,348 B2
(45) Date of Patent: Jul. 17, 2012

(54) LOCATION INTELLIGENCE MANAGEMENT SYSTEM

(75) Inventors: Brian R. Bolon, West Chester, PA (US); Jeffrey F. Bull, Chalfont, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 295 days.

(21) Appl. No.: 12/642,058

(22) Filed: Dec. 18, 2009

(65) Prior Publication Data

US 2011/0151839 A1   Jun. 23, 2011

(51) Int. Cl.
*H04W 24/00* (2009.01)
*H04M 3/42* (2006.01)

(52) U.S. Cl. ............... 455/456.1; 455/414.1

(58) Field of Classification Search .... 455/456.1–456.6, 455/422.1, 436, 424, 414.1, 466, 404.1; 709/217, 709/21, 97; 701/208, 221, 220, 214, 216; 342/357.25, 386
See application file for complete search history.

(56) References Cited

U.S. PATENT DOCUMENTS

| | | | |
|---|---|---|---|
| 4,728,959 A | 3/1988 | Maloney et al. | |
| 5,317,323 A | 5/1994 | Kennedy et al. | |
| 5,327,144 A | 7/1994 | Stilp et al. | |
| 5,608,410 A | 3/1997 | Stilp et al. | |
| 5,819,238 A * | 10/1998 | Fernholz | 705/36 R |
| 5,959,580 A | 9/1999 | Maloney et al. | |
| 5,963,940 A * | 10/1999 | Liddy et al. | 1/1 |
| 6,006,225 A * | 12/1999 | Bowman et al. | 1/1 |
| 6,092,100 A * | 7/2000 | Berstis et al. | 709/203 |
| 6,108,555 A | 8/2000 | Maloney et al. | |
| 6,119,013 A | 9/2000 | Maloney et al. | |
| 6,184,829 B1 | 2/2001 | Stilp | |
| 6,243,696 B1 * | 6/2001 | Keeler et al. | 706/21 |
| 6,317,604 B1 | 11/2001 | Kovach, Jr. et al. | |
| 6,782,264 B2 | 8/2004 | Anderson | |
| 6,904,449 B1 | 6/2005 | Quinones | |
| 7,167,713 B2 | 1/2007 | Anderson | |
| 7,577,665 B2 * | 8/2009 | Ramer et al. | 1/1 |
| 7,603,360 B2 * | 10/2009 | Ramer et al. | 1/1 |
| 7,660,581 B2 * | 2/2010 | Ramer et al. | 455/432.3 |
| 7,860,871 B2 * | 12/2010 | Ramer et al. | 707/751 |
| 2002/0068583 A1 * | 6/2002 | Murray | 455/456 |
| 2002/0164995 A1 * | 11/2002 | Brown et al. | 455/456 |
| 2003/0139190 A1 * | 7/2003 | Steelberg et al. | 455/456 |
| 2006/0003775 A1 | 1/2006 | Bull et al. | |
| 2006/0019647 A1 * | 1/2006 | Muhonen et al. | 455/419 |
| 2006/0030333 A1 | 2/2006 | Ward et al. | |
| 2007/0061245 A1 * | 3/2007 | Ramer et al. | 705/37 |
| 2007/0061302 A1 | 3/2007 | Ramer et al. | |
| 2007/0073088 A1 * | 3/2007 | Simon et al. | 568/597 |
| 2007/0150195 A1 * | 6/2007 | Koskan et al. | 701/221 |
| 2009/0098903 A1 | 4/2009 | Donaldson et al. | |
| 2009/0170528 A1 | 7/2009 | Bull et al. | |
| 2009/0248178 A1 | 10/2009 | Paulson et al. | |
| 2011/0012781 A1 * | 1/2011 | Ronald et al. | 342/357.25 |

OTHER PUBLICATIONS

International Patent Application No. PCT/US2010/058983: International Search Report and Written Opinion dated Feb. 2, 2011, 8 pages.

* cited by examiner

*Primary Examiner* — Melody Mehrpour
(74) *Attorney, Agent, or Firm* — Woodcock Washburn LLP

(57) ABSTRACT

Collection and analysis of network transaction information which includes the mobile device's usage, location, movements coupled with data from non-wireless network sources allow for the automation of analysis for the detection of anti-social behaviors.

27 Claims, 4 Drawing Sheets

LOCATION INTELLIGENCE MANAGEMENT SYSTEM

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to using location and identity information collected by wireless location systems (WLSs) and wireless communications networks (WCNs) to calculate relationships between mobile subscribers and then managing location generation resources based on location priorities, required quality of service and resource availability.

BACKGROUND OF THE INVENTION

Location has always been a feature of mobile communications systems. With the advent of cellular radio system, inherent in the functions of the wireless communications networks (WCNs) were the concepts of cell, sector, paging area and service area. These radio coverage areas created within the WCN had a one-to-one correspondence to geographic areas, but were of limited use in enabling location-based services outside of the provision of communications between the mobile device and the WCN.

As part of the Personal Communications System (PCS) auction of 1994, the Federal Communications Commission, at the behest of public safety agencies, added a requirement for the location of wireless emergency services calls for cellular and PCS systems. The FCC's wireless Enhanced 9-1-1 (E9-1-1) rules were designed to improve the effectiveness and reliability of wireless 9-1-1 services by providing 9-1-1 dispatchers and public safety agencies with geographic location information on wireless 9-1-1 calls. Location accuracy varied from the E9-1-1 Phase I rules which required that the existing WCN developed location information be converted to a geographic representation and made available to public safety agencies. Phase II of the FCC E9-1-1 rules called for high-accuracy location of emergency services wireless calls. Eventually both network-based and mobile-based techniques were fielded to satisfy the E9-1-1 Phase II high accuracy location mandate.

As realized and noted in extensive prior art, the ability to routinely, reliably, and rapidly locate cellular wireless communications devices has the potential to provide significant public benefit in public safety and convenience and in commercial productivity. In response to the commercial and governmental demand a number of infrastructure-based, handset-based and network-based wireless location systems have been developed.

Infrastructure-based location techniques use information in use within the WCN to generate an approximate geographic location. Infrastructure-based location techniques include CID (serving Cell-ID), CID-RTF (serving cell-ID plus radio time-of-flight time-based ranging), CIDTA (serving cell-ID plus time-based ranging), and Enhanced Cell-ID (ECID, a serving cell, time-based ranging and power difference of arrival hybrid). Signals that generate the WCN information that is the precursor to infrastructure-based location may be collected at the handset or at the base station and delivered to a mobile location server which has databased knowledge of both the WCN topology and geographic topology.

Network-based location solutions use specialized receivers and/or passive monitors within, or overlaid on, the wireless communications network to collect uplink (mobile device-to-base station) signals, which are used to determine location and velocity of the mobile device. Overlay Network-based techniques include uplink Time-Difference-of-Arrival (TDOA), Angle-Of-Arrival (AOA), Multipath Analysis (RF fingerprinting), and signal strength measurement (SSM). Examples of network-based systems for the determination of locations for wireless mobile units are found in Stilp, et al., U.S. Pat. No. 5,327,144; Stilp, et al., U.S. Pat. No. 5,608,410; Kennedy, et al., U.S. Pat. No. 5,317,323; Maloney, et al., U.S. Pat. No. 4,728,959; and related art.

Mobile-device based location solutions use specialized electronics and/or software within the mobile device to collect signaling. Location determination can take place in the device or information can be transmitted to a landside server which determines the location. Device-based location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. An example of a GNSS system is the United States NavStar Global Positioning System (GPS).

Hybrids of the network-based and mobile device-based techniques can be used to generate improved quality of services including improved speed, accuracy, yield, and uniformity of location. A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM). Hybrids of the network-based techniques can be used to generate improved quality of services including speed, accuracy, yield, and uniformity of location.

The use of collateral information supplied to the Wireless Location System from the Wireless Communications Network or off-line databased to enable or enhance location determination in network-based systems was introduced in Maloney, et al., U.S. Pat. No. 5,959,580; and further extended in Maloney, et al., U.S. Pat. Nos. 6,108,555 and 6,119,013. These and related following descriptions of the prior art for infrastructure-based location determination systems enable robust and effective location-determination performance when adequate measurement data can be derived or are otherwise available.

Since the advent of direct dial cellular telecommunications in 1984, and especially in the past decade, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. Also, data services, such as short-message-service (SMS), packet data services (for example the GPRS (GSM General Packet Radio Service) and IP Multimedia Subsystem (IMS) have proliferated as has the number and variety of voice, data and voice-data capable wireless devices.

The air interface protocols now used in the wireless industry include AMPS, N-AMPS, TDMA, CDMA, TS-CDMA, OFDM, OFDMA, GSM, TACS, ESMR, GPRS, EDGE, UMTS, WCDMA, WiMAX, LTE and others.

The term CDMA will be used to refer to the CDMA digital cellular (TIA/EIA TR-45.4 defined IS-95, IS-95A, IS-95B), Personal Communications Services (J-STD-008), and 3GPP2 defined CDMA-2000 and UMB standards and air interfaces. The term UMTS will be used to refer to the 3GPP specified Wideband-CDMA (W-CDMA) based Universal Mobile Telecommunications System, defining standards, and radio air interface. The term WiMAX is used to denote the IEEE defined 802.16, "Broadband Wireless"; 802.20, "Mobile Broadband Wireless Access"; and 802.22, "Wireless Regional Area Networks" technologies. The present invention also applies to the 3GPP defined Long-Term-Evolution (LTE) and the 3GPP LTE-Advanced system among others.

For further background information relating to the subject matter described herein, the reader may refer to the following patents and patent applications assigned to TruePosition Inc., or TruePosition's wholly owned subsidiary KSI: U.S. application Ser. No. 11/965,481 entitled "Subscriber Selective, Area-based Service Control" (the entirety of which is hereby incorporated by reference) which is a continuation-in-part of U.S. application Ser. No. 11/198,996 entitled "Geo-fencing in a Wireless Location System", which is a continuation of Ser. No. 11/150,414, filed Jun. 10, 2005, entitled "Advanced Triggers for Location-Based Service Applications in a Wireless Location System", which is a continuation-in-part of U.S. application Ser. No. 10/768,587, filed Jan. 29, 2004, entitled "Monitoring of Call Information in a Wireless Location System", now pending, which is a continuation of U.S. application Ser. No. 09/909,221, filed Jul. 18, 2001, entitled "Monitoring of Call Information in a Wireless Location System,", now U.S. Pat. No. 6,782,264 B2, which is a continuation-in-part of U.S. application Ser. No. 09/539,352, filed Mar. 31, 2000, entitled "Centralized database for a Wireless Location System," now U.S. Pat. No. 6,317,604 B1, which is a continuation of U.S. application Ser. No. 09/227,764, filed Jan. 8, 1999, entitled "Calibration for Wireless Location System", and U.S. Pat. No. 6,184,829 B1. Maloney, et al., U.S. Pat. No. 5,959,580; Maloney, et al., U.S. Pat. No. 6,108,555 and Maloney, et al., U.S. Pat. No. 6,119,013. Each of these is hereby incorporated by reference in its entirety.

SUMMARY

The Location Intelligence Management System (LIMS) is a data capture, storage and decision support system that utilizes available data (both past and real time) from multiple sources (such as wireless networks, wireless location network, and off line sources such as network information, geographic information, manually entered information and geo-spatial data) to optimize utilization (scheduling and selection) of wireless location resources across multiple users and entities to produce location-aware intelligence. The LIMS contains the algorithms, control logic, data storage, processors and input/output devices to analyze past and real time data obtained from multiple sources in combination or separately, to produce intelligence in the form of metadata not otherwise reasonably or easily obtained. These algorithms can iteratively use previous generated metadata to automatically contribute to new analysis, which will use both real data (past and real time) as well as metadata. Such analysis would produce information such as: identifying potential behaviors of interest, identifying specific mobile users associated with such behaviors of interest, associations between mobile device users and mobile device user identification when no public ID is available (such as with prepaid mobile devices). The LIMS then manages Position Determining Equipment (PDE) location resource utilization based on a combination of factors including but not limited to priority, accuracy, system(s) capacity, geographic distribution of PDEs, terrain, man made information (known tunnels, buildings, bridges, etc.), network information (cell distribution, coverage, network topology, network status, etc.), for performing locations on traffic channels, control channels and data sessions.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions.

Figure 1:
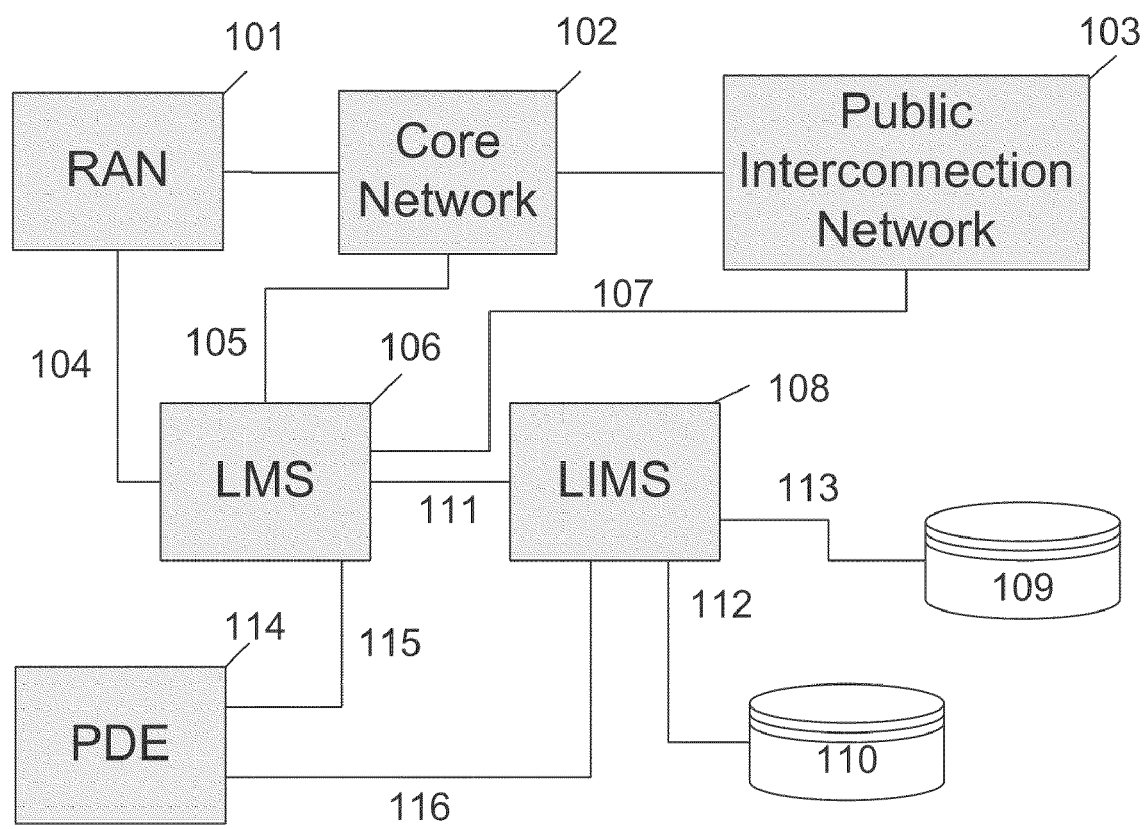
FIG. 1 schematically depicts a high level LIMS system in relation to other system nodes.

FIG. 1 illustrates the LIMS as deployed in a generic wireless communications Network (WCN). The Radio Access Network (RAN) 101 provides the radio link between the mobile device and the Core Network 102. Examples of a RAN network can include the Global System for Mobility (GSM), iDEN, Tetra, Universal Mobile Telephone System (UMTS), WiMAN, WiMAX, Long-Term-Evolution (LTE), Generic Access Network (GAN), and the IS-95/IS-2000 family of CDMA protocols among others. The Core Network provides the basic switching, routing, transcoding, metering, and interworking needed to connect and bill mobile-to-land, land-to-mobile, and mobile-to-mobile connections. The core network connects to landside networks and other mobile networks via the Public Interconnection Network 103 (nominally a SS7 network with trunking for circuit switched connections or a TCP/IP network for digital packet data connections.

The LIMS 108 subsystem is connected to the RAN 101 and Core Network 102 via the Link Monitoring System (LMS) 106. As disclosed in TruePosition U.S. Pat. No. 6,782,264, Aug. 24, 2004, "Monitoring of Call Information in a Wireless Location System," and U.S. Pat. No. 7,167,713 "Monitoring of Call Information in a Wireless Location System" and then expanded in U.S. Published Patent Application 20060003775, filed Jun. 10, 2005, "Advanced Triggers for Location-based Service Applications in a Wireless Location System," an Abis Monitoring System (AMS) or Link Monitoring System (LMS) 106 can be deployed in conjunction with the wireless location system to supply a passive means of triggering and tasking the wireless location system. As cost savings measures, an LMS 106 may be deployed to monitor the Abis (BTS-to-BSC) link only or the required LMS functionality may be incorporated directly into the BSC. Full functionality of the LMS in identifying wireless transactions, network transactions, mobile identifiers, and subscriber identifiers requires that the example GSM network, the A, Abis, and GSM-MAP interfaces, be monitored. The LMS 106 functionality can be deployed as a network of passive probes reporting back to a central server cluster or as a software-based application for inclusion in wireless infrastructure, for example, the Base Station Controller (BSC) or Radio Network Controller (RNC). The LMS 106 connects to the RAN 101 via a digital data connection 104 and to the Core Network 102 via a digital data connection 105. The LMS 106 connects with the LIMS 108 via a digital data connection 111. The LMS 106 may optionally connect with the Position Determining Entity 114 via a digital data connection 115 in cases where triggers and filters, and priorities pre-set in the LMS 106 by the LIMS 108 require a minimum latency in initiation of the location signal collection and calculation.

The LIMS 108 is a set of generic computer servers and routers running specialized interconnected software applications and databases. The LIMS 108 connects via digital data links 112 113 to multiple databases which at minimum include a network event historical database 110 and a metadata database 109. The LIMS 108 is a decision support system that determines when and how accurate a specific wireless location needs to be and where to best obtain it from given current conditions (for example, how busy different PDEs are or the concentration of concurrent requests for locations in a given geographic area). The LIMS then manages PDE 114 location resource utilization based on a combination of factors including but not limited to: priority, accuracy, system(s) capacity, geographic distribution of PDEs, terrain, man made information (such as, known tunnels, buildings, bridges), network information (cell distribution, coverage, network topology, network status), for performing locations on traffic channels, control channels and data session locations.

The LIMS 108 manages location resources based on prioritization level, resource availability, and demanded location quality of service. The LIMS 108 contains a decision support system (DSS) software application to automatically decide when to require a high accuracy location versus a lower accuracy location which does not require potentially limited PDE 114 location resources. The DSS application uses rules, databased location, identity, and transactional information (network or mobile events, time of day, geo-fence boundaries) to determine a set of scenarios based on a prioritized set of situational issues that generate metadata (which is stored in a metadata database) such as relationships between users, mobile devices, locations of interest and other mobile devices. Using the multidimensional histograms of activity and locations with dynamic conditional logic, the LIMS can determine association by proximity which can then be used as a triggering event or use location as a proxy to identity (metadata) users and relationships between users, groups and locations of interest. In setting the automatic real-time, high-accuracy location of mobile devices, the metadata analysis is used by the DDS application to compile an iterative "Risk profile", escalating number on accumulation of weighted patterns and factors for each device, Mobiles with a high risk threshold are subjected to additional scrutiny and potentially flagged to users.

The LIMS 108 receives infrastructure-generated tasking information en mass from the LMS 106 to obtain data for real time processing of currently running algorithms, to populate the network event historical database 110 for future analysis as well as details required to enable the network based location system (PDE) to perform higher accuracy locations as required. The network event historical database 110 contains all events from all triggers set in the LMS, these events include mobile identifiers (such as IMSI, IEMI, MS-ISDN, TMSI) event details (such as called number, calling number, message type) as well as location information gleaned from the wireless network parameters obtained from the event reports. The LIMS 108 creates its own complex triggers from the combination of the real time flow of mass data into the operating algorithms, use of past network event historical data 110 and past metadata database 109 and use of the DSS that optimized PDE utilization previously mentioned.

Examples of the LIMS 108 capabilities enabled by the network event historical database 110 include geo-profile (locations and events as a function of time, probability and pattern analysis) determination, associations by proximity (coorelation between two or more devices based on location proximity as a function of time and based on probability and pattern analysis in consideration of accuracy and other factors) based on histograms and conditional logic, detection of past patterns of evasive behavior (such as SIM swapping, use of multiple SIMs by the same user, use of multiple phones carried by the same user, turning mobile devices on only briefly, turning mobile devices off and on at specific locations frequently). The LIMS 108 can use a mobile's calling pattern and history for analysis, but more importantly, it can use non call related information such as registrations and location updates for additional analysis to build improved geo-profiles and associations by proximity to then recognize suspicious behavior and events. The network event historical database 110 includes records on both messaging-related and WCN control events like location updates, handovers, power up IMSI attaches and power down de-registrations). Additionally, information from the metadata database 109 (containing non-wireless, non-transmitted or generated information) can be also be used in the decision matrix. For example, user entered information on geographic areas of interest, known special terrain conditions or specific case information can be used to add additional intelligence for filtering and correlative analysis. Additionally, the metadata database 109 contains data generated from past execution of algorithms (such as geo-fence operations, targeted surveillance activity) is maintained and can be used.

In the U.S. patent application Ser. No. 11/150,414, filed Jun. 10, 2005, entitled "Advanced Triggers for Location-Based Service Applications in a Wireless Location System", TruePosition introduced the basic concept of triggers allowing for the monitoring of WCN for events and transactions that would automatically cause a location attempt based on the pre-set triggers. Use of the LIMS 108 with its decision support system (DSS) and historical and metadata database (s) enable a new class of triggers based on an additional layer of logic and filtering based on historical or off-line data. The basic trigger delivered information and other data is processed by the DSS with a set of if-then-else rules combined with databased information on events, time-of-day, and geofence boundaries to create a database of metadata. The newly created metadata allows the LIMS to perform analysis where the location of a mobile is used as a proxy to identity, purpose and relationships with other mobile users. The same metadata can be used to enhance forward looking algorithms which in turn produce new complex triggers.

An example of a complex trigger than uses network event historical database 110 in conjunction with real time network information is a when two or more mobile devices exhibit the same location behavior over a period of time, such as being co-located while moving around for periods of time, implying they are traveling together, but there is no information in the historical database indicating they ever call or SMS each other. Then, the LIMS can decide to utilize high accuracy PDE resources to further verify or dispute this heuristic information. Such high accuracy locations would be based on real time network events, either passive or actively generated to determine location of said subjects at the same point in time. This can remain in operation for extended periods of time to increase confidence in the correlation.

Another example is the automatic detection of SIM swapping based on historical data as compared to the real time data coming in from the network. Once detected, the LIMS can then decide to trigger the PDE to locate the mobile(s) using high accuracy at that point in time or on a continuous basis depending on the user conditions set up in the LIMS such as location area where this occurs, time and day constraints, proximity to other known mobile devices, etc. Automatic use of high accuracy location helps build up a set of high accuracy information in the metadata database for a set of high risk mobile devices and their users for future correlation with other mobile devices, public events (such as crimes, public gatherings, etc.) sites and points of interest (such as tunnel entry/exit point, overlook observation points) as the high accuracy resources are limited and can not be provided for every mobile and every network event.

Network Event historical database 110 (may actually be one or more databases) contains information on every network event transaction that occurs in the covered area for all mobile devices as configured. This could be reduced to a specific set of mobile devices via a list of identifiers for inclusion only or exclusion only. Said database contains selected information for each event including all available known identifiers of the specific mobile (one or more of the following: TMSI, IMSI, IMEI, MSISDN). It also includes event related information including the event type (such as hand over, mobile originated call, SMS received, etc.) and related event data such as dialed digits and timestamps. Additionally, each event contains relevant network information depending on the network type (cell site and TA for GSM, CI and SAI for UMTS, etc.). The network event historical database also includes some metadata for each specific event (not related to other events or combinations) which includes a calculated X,Y location based on best available location processing (including high accuracy) as well as additional identifiers populated (such as MSISDN) that may not have actually existed in the network event but are known to belong to the said mobile device through correlation previously provided in the LMS or LIMS.

Metadata database 109 (may actually be one or more databases) contains information that is input by users (manually or automatically) and information that is produced as a result of processes or algorithms on the LIMS 108. User input data can contain maps information including but not limited to streets, terrain, clutter, buildings, foliage, tunnels, pipelines, facilities (airports, bases), sites or areas of interest (such as buildings or border crossings points or geo-fence definitions), can also contain network information including but not limited to cell site locations, antenna sizes, azimuths, directions, down tilt, can include high accuracy location results for specific algorithms that have run in the past (such as geo-fence operations or surveillance operations) as well as specific information related to conditions and parameters used in past algorithm runs.

LIMS Platform in GERAN Network

Figure 1A:
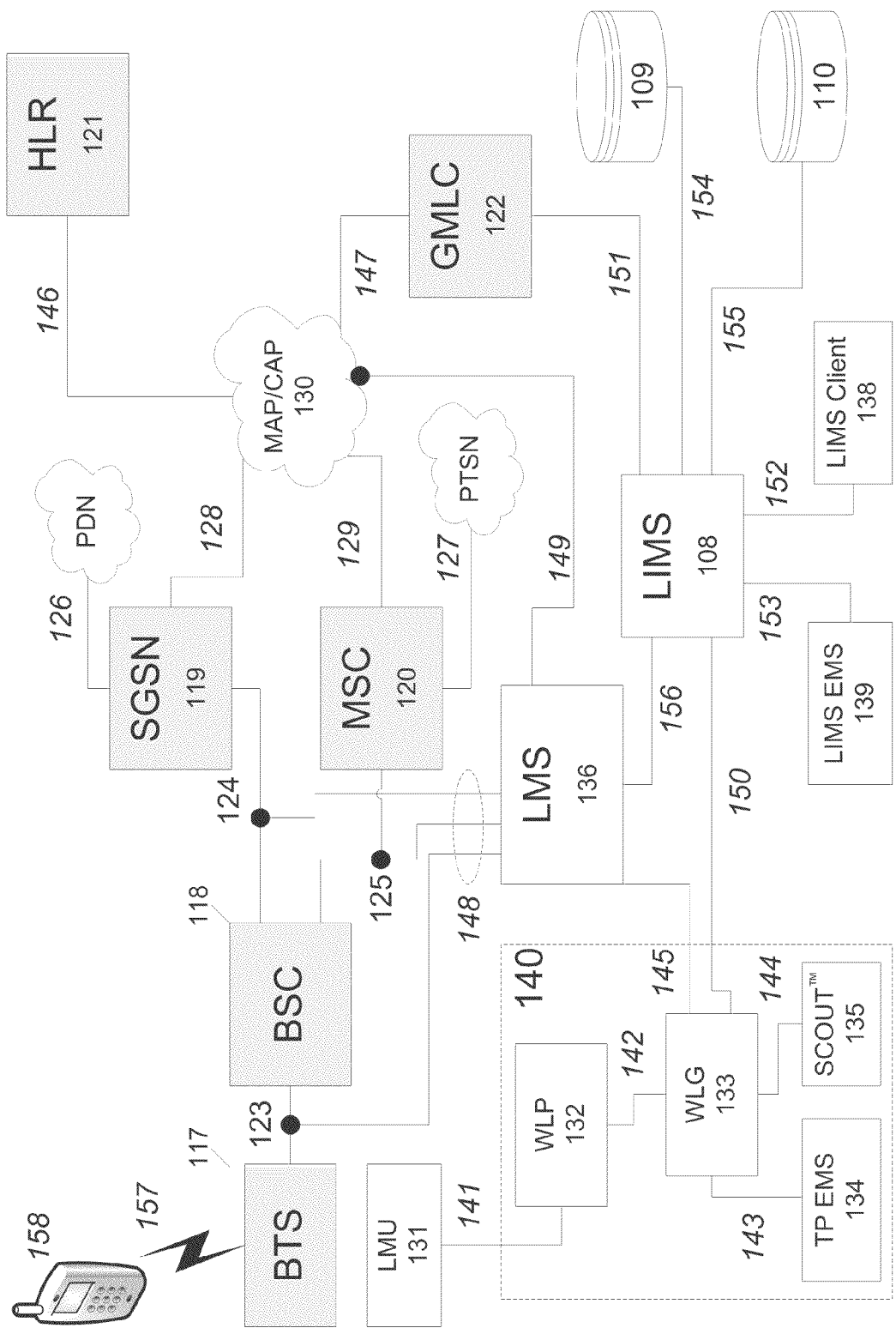
FIG. 1a depicts an example LIMS system as instantiated in a GERAN-based wireless communications network.

FIG. 1*a* details functional nodes of an illustrative embodiment of the LIMS platform and associated subsystems installed into a GERAN (GSM with GPRS) network.

The metadata (data about data) database 109 contains information obtained results of analysis performed by the LIMS automated processes or by the LIMS operators on data acquired from the LMS's collected network transaction messaging and/or acquired from other databases and sources. Examples of metadata include associations between mobiles including past proximity and calling patterns. Past assessments of risk/threat levels are profiled here. The metadata could use multidimensional indexing allowing for storage and retrieval of data such as coincident timing and proximity to events, mobiles or locations of interest, mobile equipment or mobile identity changes, and associations between mobile users.

The historical database 110 contains the records (which include mobile identifier, timestamp, and cellular network location (CGI, CGI with ranging)) obtained via the LMS or from the cellular network.

The BTS (Base Transceiver Station) 117 is the GSM-defined distributed radio point of connection for the GSM radio air interface 157 network. The BTS is also responsible for encryption/decryption of data sent over the air interface.

The BSC (Base Station Controller) 118 handles radio resource management, such as frequency allocation and handovers, and in some cases transcoding and multiplexing tasks. Data streams are routed through the BSC 118 via the packet control unit to the SGSN 119 while voice circuits are routed to the MSC 120.

The SGSN (Serving GPRS Support Node) 119 provides session and mobility management for GPRS-equipped mobile devices. The SGSN 119 also serves as a router for transport of packet data streams to and from GPRS-equipped mobile devices.

The MSC 120 provides session and mobility management for GSM mobile devices. The MSC 119 also supports basic voice circuit switching tasks and as interface to Intelligent Networking and other SS7 network interconnected subsystems.

The Visitor Location Register (VLR) (not shown), a dynamic database of user account information downloaded from various HLRs 121, is typically co-located on the MSC 120 computing platform.

The HLR (Home Location Register) 121 is primarily a database of user account information of a wireless carrier's customers. The user account database contains billing information, status, current/last known network address and services preferences.

The GMLC (Gateway Mobile Location Center) 122 is the gateway, bridge, and router for location services. IP-based interfaces such OMA-defined MLP or Le interface are interconnected via the GMLC 112 to the SS7 network-based nodes over such interfaces as the Lg interface (to MSC 120), Lc interface (to SCP (not shown), or Lh interface (to HLR 121) interface. Basic administration, authentication, accounting and access control functions for location services may also be implemented on the GMLC 122. The GMLC 112 may be used by the LIMS 140 to ping an idle mobile 157 via the standardized AnyTimeInterrogation procedure or SMS type 0 which silently pages the idle mobile so it resumes contact with the wireless network to exchange control channel signaling.

The Abis interface 123 carries data and control information between the BTS 117 and BSC 118. The Abis interface 123 is optional as the BTS 117 and BSC 118 may be combined.

The Gb interface 124 carries data and control information between the BSC 118 and the SGSN 119.

The A interface 125 carries data and control information between the BSC 118 and the MSC 120.

The Ga Interface 126 interconnects the SGSN 126 with the Gateway GPRS Support Node (GGSN—not shown) and the Public Data Network (PDN) 159.

Switch Circuit Trunks 127 interconnect the Public Telephone Switched Network (PTSN) 160 with the MSC 120 switching facilities.

The SGSN 119 SS7 network interconnection 128 includes the Gr Interface used to interconnect the SGSN 119 with the HLR 121 for requesting of user information and updating of network location and the Lg Interface used to communicate with the GMLC for location tasking and AnyTimeInterrogation or sending of an SMS type 0 to idle mobile devices.

The MSC 120 SS7 Network interconnection 129 includes the D Interface used to interconnect the MSC 120 with the HLR 121 for requesting of user information and updating of network location and the Lg Interface used to communicate with the GMLC for location tasking and AnyTimeInterrogation or sending of an SMS type 0 to idle mobile devices.

The MAP/CAP Network 130 is used here to show the international SS7 packet network used to connect SS7 nodes in the Core Network 102. MAP (Mobile Application Part) is the control information sent between nodes while CAP (CAMEL Application Part) is the Intelligent Networks protocol used to enable telephony and database services. The Gr, Lg, Lh, and D interfaces (among others not shown) all traverse the SS7 network.

The LMU (Location Measurement Unit) 131 is the geographically distributed radio receiver network used to collect uplink (mobile 157 to BTS 117) radio signals for use in network-based location techniques (TDOA, AoA, TDOA/AOA) or TDOA/GNSS hybrid location calculation.

The Wireless Location Processor (WLP) 132 manages the LMU network 131, schedules the LMUs 131 for signal collection and calculates Uplink Time Difference of Arrival (U-TDOA), Angle of Arrival (AOA), or Hybrid Location Solution (HLS) location estimates.

The WLG 133 receives triggers from the LIMS 137, LMS 136, GMLC 122, or carrier network 101 102, tasks the WLP 132, and provides the estimated location to the LIMS 137 or GMLC 122. The WLG also provides an external alarm feed to a customer's Network Operations Center (NOC) (not shown).

The TruePosition EMS (TP EMS) 134 provides the network management for the location equipment including configuration, performance management, status, and fault management.

The SCOUT™ Tool 135 is used to provision the Wireless Location System (WLS) which is made up of the LMU network 131 and SMLC cluster 140.

The Link Monitoring System (LMS) 136 extracts control messages between the mobile device and the cellular network and provides triggers based on network events to the WLG. The LMS 136 supports both network probes and radio probes.

The LIMS Client 138 is the Man-Machine-Interface (MMI) terminal used to operate the LIMS and display outputs.

The LIMS EMS 139 provides network management over the LIMS 137, LMS server and probes 136.

The SMLC 140 is the distributed cluster of location network servers for the WLP 132 and WLG 133 functions.

The LMU-to-WLP Interface 141 is a digital data link either multiplexed over a switch circuit trunk or via IP-based transport such as Ethernet.

WLP-to-WLG Interface 142 is a high-speed Ethernet or Token Ring communications interface.

WLD-to-EMS Interface 143 is a Ethernet communications interface.

WLG-to-SCOUT Interface 144 is an Ethernet communications interface. WLG-to-LMS Interface 145 is a high-speed Ethernet or Token Ring communications interface.

The HLR SS7 connection 146 carries the D (from the MSC), G (from the SGSN), and Lh interfaces.

The GMLC SS7 network interconnection 147 includes the Lg interface for communication with the MSC 120 and SGSN 119 as well as the Lh interface for communication with the HLR 121.

The RAN Probe interfaces 148 which connect the LMS 136 to the distributed wired or wireless probes are typically Ethernet communications interfaces.

The Core Network Probe interface 149 which connects the LMS 136 to the SS7 network probe(s) is typically an Ethernet communications interface.

The LIMS-to-WLG interface 150 is a high-speed Ethernet or Token Ring communications interface.

The LIMS-to-GMLC interface 151 is a high-speed Ethernet or Token Ring communications interface.

LIMS client interface 152 is typically an Ethernet communications interface. LIMS EMS interface 153 is typically an Ethernet communications interface.

The metadata database interface 154 may be a high capacity, high speed interface specifically designed as database storage interface such as Fiber Channel or may be a more generic Ethernet type interface dependent on the capacity and local networking capabilities.

Historical database interface 155 is a high capacity, high speed interface specific to database storage such as Fiber Channel.

The LMS-to-LIMS interface 156 a high-speed Ethernet or Token Ring communications interface.

The Radio Air interface 157 is the Um interface specified for GSM by the European Telecommunications Standards Institute (ETSI) currently working through the 3rd Generation Public Partnership (3GPP).

The Mobile Station 158 is may be a GSM-capable mobile device or may be a multi-mode GMS/GPRS/SMS voice and data mobile terminal. With the addition of the UMTS mode, the Mobile Station 158 becomes known as a UE or User Equipment.

Exemplary LIMS Network

Figure 2:
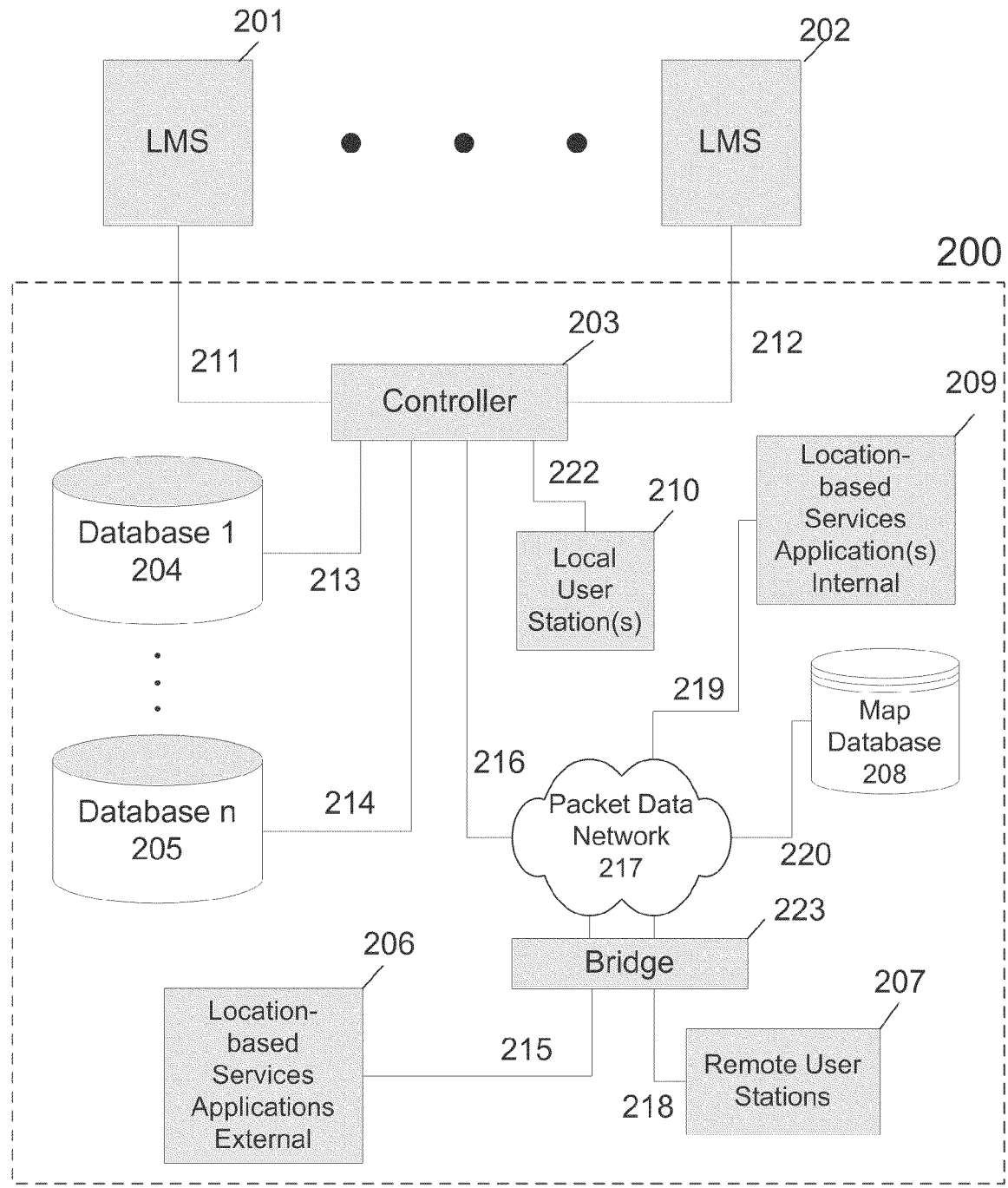
FIG. 2 illustrates functional subsystems of the LIMS system.

FIG. 2 details an example of the LIMS network. In this example, the LMSs 201 202 are separate from the LIMS deployment 200, although in practice, the functionality could be combined on the same server platform or cluster of servers. The LIMS and LMS are deployed in a 1-to-1 or 1-to-many configuration based on needed capacity, number of wireless carriers to monitor, or geographic service area.

The LIMS controller 203 uses generic digital data interconnects to the LMS platforms 201 202. The controller 203 is both a packet router as well as a firewall providing authentication and access control. As part of the router function the controller 203 performs event scheduling, packet filtering and inter-subsystem communications. Provisioning, monitoring and control of the LMS network 201 202 is also performed via the controller 203 communications interfaces 211 212. Said controller 203 also contains the aforementioned control logic and algorithms for generating complex triggers and may be a single or cluster of servers.

The controller 203 directs LMS 211 212 obtained wireless network transaction information to database 204 via a high speed database interface 213. Additional information such as high-accuracy location, association data (metadata), and sensor fusion (such as image recognition, photos, videometric identity) data may be stored on additional databases 205 that may be remotely housed or internal to the LIMS deployment 200 (as shown). The interface 214 to the other databases 205 is dependent on deployment specifics but can take the forms of any of a number of local-area-network (LAN), wide-area-network (WAN) or database specific interfaces.

The controller 203 allows for recovery of databased wireless network transaction information from the database 204 via 213 via the generic Ethernet interfaces 222 218 which interconnect the local user stations 210 and remote user stations 207.

The LIMS deployment's Local Area Network 217 offers packet data connectivity to all subsystems under the controller's 203 rules. The controller connects to the LAN 217 via Ethernet 216 as does the internal location-based services applications server 209 via link 219 and the Map database 208 via data link 220.

The local user stations 210 and remote user stations 207 via the controller 203 and the associated packet data network 217 have access to the databased wireless information 204, but also internal location-based services applications 209, external location-based services applications 206 and digital mapping database(s) 208. The external applications 206 and remote user stations 207 interconnections 215 and 216 may take the form of a variety of transport links which are translated by the Bridge 223. The Bridge 223 also supports additional authentication, access control, monitoring, and intrusion security for the external or remote components 206 207.

ILLUSTRATIVE EXAMPLE OF COMPLEX TRIGGERS

LIMS-IED Scan Feature

A LIMS user can pre-check a route that someone will soon travel for potential mobile phone detonated IEDs or individuals waiting to ambush a vehicle such as using a wired IED (or use of other weapons) along specific roads and areas. The LIMS user will draw geo-fence around route to be taken. The LIMS will run a specialized algorithm that will first look back into the historical database 110 for a predetermined period of time and create a list of all mobile devices that could have had presence in the area in the timeframe based on the best location information available, available events and interpolation between events, locations and timestamps. This will include mobile devices with location update events only (such as if idle and stationary) as location updates are periodic based on network operator configured timeouts. This configuration would be known and used in consideration of how far back in time the scan must look to determine potential mobile devices in the area. Additionally, any mobile devices with recent activity appearing to linger around area of interest or which turned the mobile device on or off in conjunction with the above. Additionally, further enhancements such as use of known terrain features, commonly travel routes and possible overlook points can be included in the analysis. This will create a list of candidate mobile devices that may be in the area and can provide higher priority to devices that show a higher risk profile based on user input data.

The LIMS algorithm will then use various means to automatically obtain a high accuracy location on each device on the list. Devices active on a call or data session can be immediately located and determined if still in or near the area of interest. Devices not currently active can be stimulated by using advanced triggers such as ATI or NULL SMS, depending on network type and supported capabilities, then high accuracy location is possible on all such devices and this determines their immediate location. If they are still in the area, they will now show up on a threat list and map to the user with information on how long they have been there. The LIMS will then keep tracking these devices periodically until they leave the area of interest and any others that may enter the area until the algorithm is disabled.

It is understood the above description of the algorithm is illustrative and can be changed and enhanced to use any of the data sources mention above. It is also understood that this approach will have challenges in highly populated areas where there are potentially thousands of mobile devices in and around a define area of interest. So while this approach is most useful in less populated areas, is can be tuned and enhanced to work in more populated areas via the same means. In this case, the human user may have more a larger threat list to analyze and make a judgment call. In all cases, the resulting information is useful is assessing risk and potential threats along a route before it is traveled. These results can tell the user where there is a potential IED on a roadside (mobile device detonated IED) or where there is one or more lookouts sitting idle along a road where there may be a manual IED or other ambush planned. The users can then utilize the provided information as they deem fit, such as identifying an alternative route with less risks identified, or directing other surveillance technologies to the area to validate the information, or even testing the device as follows.

ILLUSTRATIVE EXAMPLE

Remote IED Detonation

In the above example, if there has been potential mobile device detonated IEDs identified based on the LIMS provided information, alternative intelligence and or human intelligence, the user can decide to use the LIMS to stimulate the potential mobile device detonated IED by sending it a normal SMS or placing a call to the mobile device. If it is a typical mobile device detonated IED this will cause it to detonate in a controlled manner. If the device was not an IED, then no harm was done.

Figure 3:
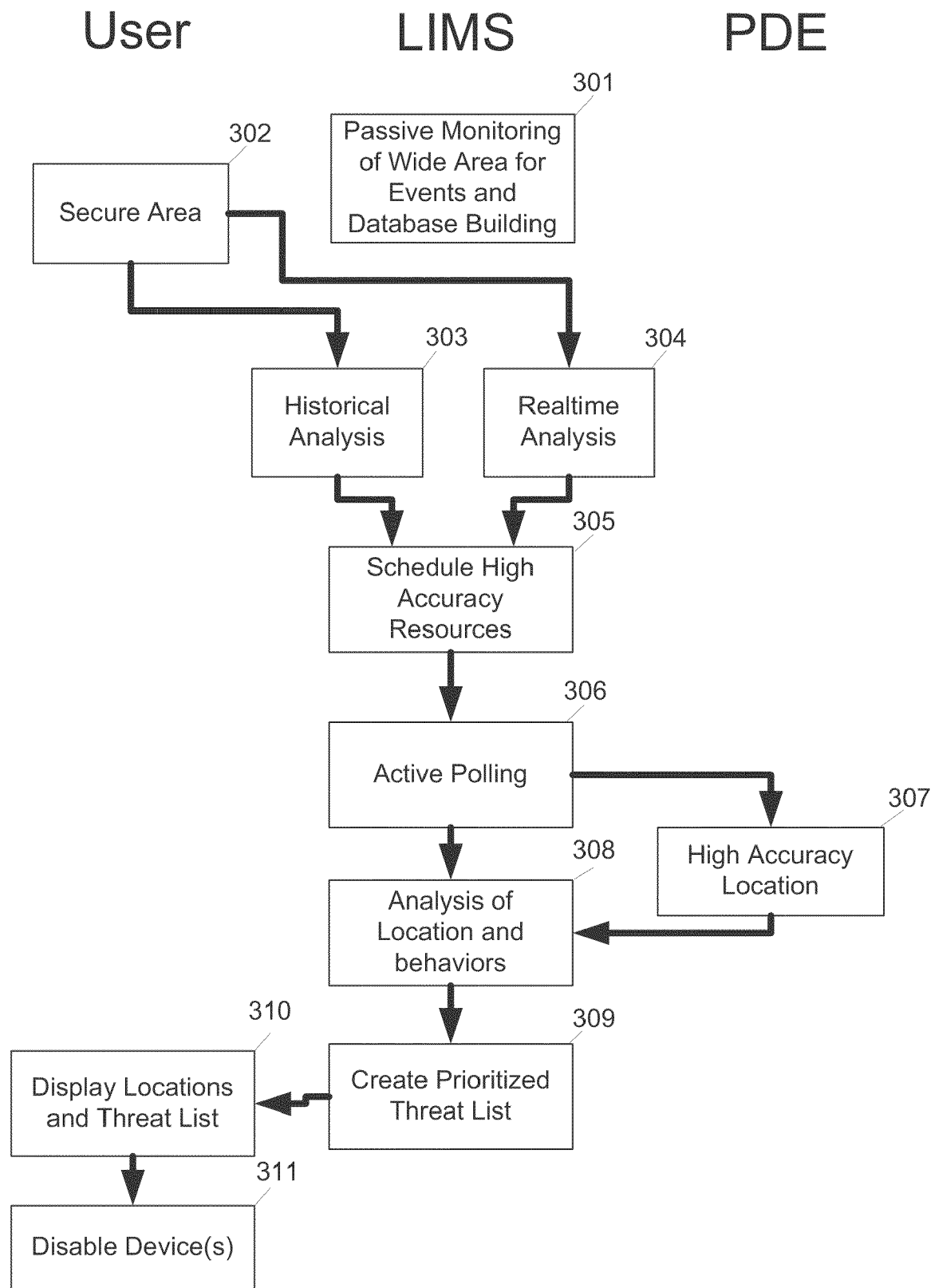
FIG. 3 shows the process flow for a specific LIMS enabled application-command controlled Improvised Explosive Device discovery and disablement.

FIG. 3 illustrates using the LIMS for detecting a command-detonated IED scenario as well as detailing the general LIMS enabled features used in the analysis of historical and real-time data. The LIMS network (which includes the LMS) is deployed in a carrier network (or multiple carrier networks). The LMS component is pre-set with a set of triggers that passively capture a selection of network events 301. These triggers include mobile-origination, mobile-termination, location update, IMSI attach and IMSI detach and can include additional mid-call event triggers such as Network Measurement Report (NMR). This background passive monitoring and databasing of events continues on an indefinite basis. The LIMS can add or delete network transaction triggers in the LMS at time as needed to facilitate the complex associative triggers used in the analysis software such as the DSS in the LIMS.

When an area (such as a roadway) is to be secured, the user determines the geographic area to be secured and the time window for the operation 302. The LIMS, in response, starts a parallel series of operations. First, a historical analysis of monitored events from the historical database begins 303. Secondly, a real-time analysis of current activity in the selected area is started 304. For both the real-time and historical analysis, the best available location derived from the cellular system information (cell-id, sector, timing and or power-based ranging) in the current or historical monitored information is used to find mobile devices locations in the approximate area in and round the selected geographic area.

Once the first, rough set of mobile's identities and locations are determined, the LIMS schedules its attendant high-accuracy Positioning Determining Equipment, sets internal filtering and triggering, and then silently polls the first set of mobile devices (this active, silent polling uses the AnyTimeInterrogation (ATI) or null-SMS capability provided by the SMS-C or the GMLC (in CAMEL Phase III, IV). High accuracy location includes TDOA, AoA, TDOA with AoA and hybrids.

Using the LMS and PDE, the network transaction triggering and associated radio uplink transmissions are detected and a high accuracy location is performed 307. It is the LIMS' responsibility to schedule the PDE resources and active polling as to optimize the location rate, location accuracy (possible retries may be needed) and location over the selected area (for instance, the LIMS may schedule mobile devices closer to the start of a route first, or mobile devices with the highest possibility of being next to the route).

As high accuracy locations become available, the LIMS begins analysis of the high accuracy location historical behaviors. The LIMS removes mobile from the first list that are not in proximity to the route. Since new mobile devices may enter the selected area at any time, the real-time analysis 304 can cause additional scheduling of high accuracy resources 305, active polling 305 and high accuracy location 307 at any time in the selected time window. Using the rules based decision support system, the newly refined second list of mobile devices is analyzed for suspicious behaviors and location proximity to the route 308 (for instance, a mobile phone that has never made a call since power-up is in close proximity to the road through multiple periodic registration cycles is flagged). The DSS prioritizes suspicious mobile devices and presents the entire second list of mobile identifiers, locations, and priority to the user 310 as a threat list. The user can then select from a variety of options detailed above. The LIMS and attendant subsystems continue operation until the time window closes or the present operation is discontinued by the user. Events generated by the LMS in response to the initial set of triggers or additional sets of triggers within the LIMS as well as the high accuracy locations generated all get stored in the historical database indexed by time, mobile identifiers, event, and location. metadata generated during the analysis by the LIMS is stored in the metadata database which could be indexed by time, mobile identifiers, event, and location, relationship and priority for future use or review. Using the delivered risk assessment, the user can choose a to disable the mobile device 311 via several methods. Working with the local wireless operator, the mobile device can be denied further network access. The device may be messaged (short message service (SMS), or called since the identity including the dialable directory number is known (perhaps resulting in detonation). Alternately, local personnel can be vectored to the position for manual observation and disablement. If not disabled, the device may be monitored for addition radio activity by the LIMS, or placed under observation by local personnel or video means.

ILLUSTRATIVE EXAMPLE

Relational Based Triggers

In many scenarios, it is desired to gain information on associates of an individual and their corresponding mobile device. One such was to automatically obtain this is via LIMS where it can set relational based triggers. One example of a relational based trigger is any device that makes contact with a specific device, denoted by a unique ID (such as IMEI, IMSI, and MSISDN). When the other device sends (or receives) an SMS, data message or phone call to (or from) the specific device, the LIMS can trigger high accuracy locations on the other device instantaneously. This could be used to allow a potential IED to be detonated by sending a "decoy" to the area while having set the LIMS to do a relational trigger on this device. When the IED goes off, the LIMS will immediately locate the calling/sending device and provide the information to the LIMS users. Even if the calling subject turns off the device immediately thereafter, having high accuracy location information on the calling subject immediately is very useful information as near by resources can be deployed or other mobile devices in the proximity can be flagged as potentially belonging to the same subject or associates thereof and then tracked. If the actual trigger device is not turned off, it can then be tracked via high accuracy for a user define period of time. In both cases, the tracking of such devices could enable collection of additional information and the apprehension of the suspect.

In general, this could automatically be extended using relational based triggers to then automatically obtain high accuracy locations and information on any other mobile devices that communicates with this device such as through SMS or calling. This can be iterative and then produce a set of relational data that is stamped with high accuracy locations of each device in the list at the time of transaction and optionally there after. Another example of relational based triggers is when two or more mobile devices remain in the proximity of one another (even if the said devices never communicate directly between one another), and once validate using high accuracy, appear to be associated based on various correlative techniques such as being together when moving fast along a road (in a car together) and tend to remain together for periods of time while moving around.

The LIMS could determine potential candidates for this type of match based on algorithms based on lower accuracy information and then trigger high accuracy location as needed to validate or invalidate potential matches. This could be based of a known mobile device, (such as a known mobile and look for other mobile devices that correlate geographically in time) or could be a completely random brute force approach (LIMS looks into historical database and randomly finds and determines matches) or geographically based (devices that frequent certain areas to be used as a starting point and then seek to find others that correlate). Once the LIMS has determined geographical association with two or more mobile devices with a high probability, the LIMS user can then be alerted and the metadata created stored for later use.

Conclusion

The true scope the present invention is not limited to the presently preferred embodiments disclosed herein. For example, the foregoing disclosure of a presently preferred embodiment of a Wireless Location System uses explanatory terms, such as LMS (Link Monitoring System, RNM (Radio Network Monitor), Serving Mobile Location Center (SMLC), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein are based on software applications running on generic hardware processing platforms. These functional entities are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LIMS) described herein to another functional element (such as the SMLC) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A location information management system (LIMS), comprising:
   a controller computer;
   a historical database operatively coupled to the controller computer and configured to store network event historical data; and
   a metadata database operatively coupled to the controller computer and configured to store metadata;
   wherein the LIMS is configured to utilize past and current real time data from multiple sources, including a wireless network, a wireless location network, and off-line sources including network information, geographic information, manually entered information and geo-spatial data, to optimize utilization of wireless location resources across multiple users and entities to produce location-aware intelligence.

2. A LIMS as recited in claim 1, wherein the LIMS is further configured to analyze the past and current real time data obtained from multiple sources to produce intelligence in the form of metadata, and to store the metadata in the metadata database.

3. A LIMS as recited in claim 2, wherein the LIMS is further configured to iteratively use previously generated metadata to automatically contribute to new analysis that uses both real data as well as metadata, wherein said analysis produces information including: identification of potential behaviors of interest, identification of specific mobile device users associated with said behaviors of interest, associations between mobile device users, and mobile device user identification.

4. A LIMS as recited in claim 3, wherein the LIMS manages location resource utilization based on a combination of factors including priority, accuracy, system capacity, geographic distribution of position determining entities (PDEs), terrain, man-made information, and network information.

5. A LIMS as recited in claim 4, wherein the LIMS is further configured to determine when a specific wireless location needs to be obtained, how accurate the specific wireless location needs to be, and where to best obtain it from given current conditions.

6. A LIMS as recited in claim 5, further comprising a decision support system (DSS) software application capable of automatically deciding when to require a high accuracy location versus a lower accuracy location.

7. A LIMS as recited in claim 6, wherein the DSS application uses rules, databased location, identity, and transactional information to determine a set of scenarios based on a prioritized set of situational data that determine metadata including relationships between users, mobile devices, locations of interest, and other mobile devices.

8. A LIMS as recited in claim 7, wherein the LIMS is further configured to use multidimensional histograms of activity and locations with dynamic conditional logic to determine association by proximity, and to use this information as a triggering event.

9. A LIMS as recited in claim 8, wherein the LIMS is further configured to use location as a proxy to identify users and relationships between users, groups and locations of interest.

10. A LIMS as recited in claim 9, wherein metadata analysis is used by the DDS application to compile an iterative risk profile for mobile devices.

11. A LIMS as recited in claim 10, wherein mobile devices with a high risk threshold are subjected to additional scrutiny.

12. A LIMS as recited in claim 11, wherein the historical database contains events from triggers, said events including mobile identifiers including IMSI, IMEI, MSISDN, and TMSI identifiers, event details including called number, calling number, and message type, and location information gleaned from wireless network parameters obtained from event reports.

13. A LIMS as recited in claim 12, wherein the LIMS is further configured to create complex triggers from a combination of real time flow of mass data into operating algorithms, network event historical data, metadata and user provided data.

14. A LIMS as recited in claim 13, wherein the LIMS is further configured to use a mobile device's calling pattern and history for analysis, and to use non call-related information, including registrations and location updates, to recognize suspicious behavior and events.

15. A LIMS as recited in claim 14, wherein the historical database includes records on both messaging-related and wireless communications network control events including location updates, handovers, power up IMSI attaches, and power down de-registrations.

16. A LIMS as recited in claim 15, wherein trigger information and other data is processed by the DSS with a set of if-then-else rules combined with databased information on events, time-of-day, and geofence boundaries to create metadata, wherein the metadata allows the LIMS to perform analysis where the location of a mobile device is used as a proxy to identify purpose and relationships with other mobile device users.

17. A LIMS as recited in claim 16, wherein the historical database contains:
   information on network event transactions that occur in a covered area for a set of mobile devices, including selected information for each event including all available known identifiers of the specific mobile device, including one or more of TMSI, IMSI, IMEI, and MSISDN;
   event-related information including the event type, including handover, mobile originated call, SMS received, dialed digits, and timestamps;
   event-related network information depending on network type; and
   metadata for each specific event that includes a calculated location.

18. A LIMS as recited in claim 17, wherein the metadata database contains:

information input by users, including map information and network information including cell site locations, antenna information, and location results for specific algorithms that have run in the past; and information that is produced as a result of processes or algorithms on the LIMS.

19. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities; and utilizing data from the following sources for scheduling and selection of wireless location resources: a wireless network, a wireless location network, and off-line sources including network information, geographic information, manually entered information and geo-spatial data.

20. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities; and utilizing data from the following sources for scheduling and selection of wireless location resources: a wireless network, a wireless location network, and off-line sources including network information, geographic information, manually entered information and geo-spatial data;

wherein the historical database contains events from triggers, said events including mobile identifiers including IMSI, IMEI, MSISDN, and TMSI identifiers, event details including called number, calling number, and message type, and location information gleaned from wireless network parameters obtained from event reports.

21. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities; and utilizing data from the following sources for scheduling and selection of wireless location resources: a wireless network, a wireless location network, and off-line sources including network information, geographic information, manually entered information and geo-spatial data;

wherein the historical database includes records on both messaging-related and wireless communications network control events including location updates, handovers, power up IMSI attaches, and power down de-registrations.

22. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities; and utilizing data from the following sources for scheduling and selection of wireless location resources: a wireless network, a wireless location network, and off-line sources including network information, geographic information, manually entered information and geo-spatial data;

wherein the historical database contains:

information on network event transactions that occur in a covered area for a set of mobile devices, including selected information for each event including all available known identifiers of the specific mobile device, including one or more of TMSI, IMSI, IMEI, and MSISDN;

event-related information including the event type, including handover, mobile originated call, SMS received, dialed digits, and timestamps;

event-related network information depending on network type; and metadata for each specific event that includes a calculated location.

23. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities; and utilizing data from the following sources for scheduling and selection of wireless location resources: a wireless network, a wireless location network, and off-line sources including network information, geographic information, manually entered information and geo-spatial data;

wherein the metadata database contains:

information input by users, including map information and network information including cell site locations, antenna information, and location results for specific algorithms that have run in the past; and information that is produced as a result of processes or algorithms on the LIMS.

24. A method for use in operation of a location information management system (LIMS), comprising:

maintaining a historical database storing network event historical data;

maintaining a metadata database storing metadata;

utilizing past and current real time data from said historical database and said metadata database for scheduling and selection of wireless location resources across multiple users and entities;

utilizing data from the following sources for scheduling and selection of wireless location resources: a wireless network, a wireless location network, and off-line sources including network information, geographic information, manually entered information and geo-spatial data; and processing trigger information and other data with a set of if-then-else rules combined with databased information on events, time-of-day, and geofence boundaries to create metadata for use in analysis where the location of a mobile device is used as a proxy to identify purpose and relationships with other mobile device users.

25. A method for use in operation of a location information management system (LIMS), comprising:
maintaining a historical database storing network event historical data;
maintaining a metadata database storing metadata;
utilizing past and current real time data from said historical database and said metadata database for scheduling and selection of wireless location resources across multiple users and entities;
utilizing data from the following sources for scheduling and selection of wireless location resources: a wireless network, a wireless location network, and off-line sources including network information, geographic information, manually entered information and geo-spatial data; and
using metadata to produce complex triggers for location processing.

26. A method as recited in claim 25, further comprising creating a complex trigger using network event information in the historical database in conjunction with real time network information, said complex trigger indicating when at least two mobile devices are co-located while moving around for a period of time, thus implying that the at least two mobile devices are traveling together.

27. A method as recited in claim 25, further comprising creating a complex trigger for the automatic detection of SIM swapping based on historical data as compared to the real time data coming from the network.

* * * * *